United States Patent [19]

Thornton

[11] Patent Number: 5,022,973
[45] Date of Patent: Jun. 11, 1991

[54] METHOD OF ELECTROSTATICALLY ENHANCED SOLVENT EXTRACTION AND APPARATUS THEREFOR

[75] Inventor: John D. Thornton, Evesham, United Kingdom

[73] Assignee: United Kingdom Atomic Energy Authority, London, United Kingdom

[21] Appl. No.: 386,117

[22] Filed: Jul. 28, 1989

[30] Foreign Application Priority Data

Aug. 15, 1988 [GB] United Kingdom ............... 8819378

[51] Int. Cl.$^5$ ............................................. G21C 19/50
[52] U.S. Cl. ................................... 204/186; 204/302; 210/243; 210/748; 422/256
[58] Field of Search ............... 204/302, 304, 305, 306, 204/307, 308, 149, 186, 188, 189, 190, 191; 210/634, 748, 243; 422/256, 257

[56] References Cited

U.S. PATENT DOCUMENTS

| | | | |
|---|---|---|---|
| 2,794,711 | 6/1957 | Hall et al. | 422/257 |
| 3,488,159 | 1/1970 | Moon et al. | 422/257 |
| 4,204,934 | 5/1980 | Warren | 204/186 |
| 4,237,028 | 12/1980 | Hughes | 252/359 B |
| 4,702,815 | 10/1987 | Prestridge | 204/302 |

FOREIGN PATENT DOCUMENTS

| | | |
|---|---|---|
| 0020049 | 12/1980 | European Pat. Off. . |
| 0057324 | 8/1982 | European Pat. Off. . |
| 858691 | 10/1952 | Fed. Rep. of Germany . |
| 1205562 | 9/1970 | United Kingdom . |

OTHER PUBLICATIONS

J. D. Thornton, "Electrically Enhanced Liquid-Liquid Extraction", Birmingham University Chemical Engineer; vol. 27, No. 1, Spring, 1976, pp. 6—13.

Primary Examiner—John F. Niebling
Assistant Examiner—William T. Leader
Attorney, Agent, or Firm—William R. Hinds

[57] ABSTRACT

A solvent extraction column in which a disperse phase in the form of electrostatically charged droplets contacts a fluid continuous phase. The disperse phase is received in a number of trays having radial nozzles, so that the disperse phase is discharged from the nozzles as charged droplets transverse to the general direction of flow in the column when an electric potential is applied between the trays and the column.

17 Claims, 3 Drawing Sheets

METHOD OF ELECTROSTATICALLY ENHANCED SOLVENT EXTRACTION AND APPARATUS THEREFOR

This invention relates to enhanced solvent extraction, and in particular to a method and an apparatus for electrostatically enhanced solvent extraction.

In known electrostatic solvent extraction cells, relatively high extraction rates can be obtained if the dispersed phase is charged electrically by passing it through charged nozzles, and then subsequently accelerating the charged dispersed phase droplets in an electrical field. This procedure not only gives rise to very small drops (and hence a large interfacial area for mass transfer) but also involves very short contact times by virtue of the high drop velocity. The process is thus ideally suited to the extraction of labile and unstable materials, frequently of biological origin.

UK Patent 1205562 envisaged a column comprising a number of stacked sieve plates and a bank of nozzles which are in communication with an inlet for the dispersed phase. The nozzles are arranged to discharge longitudinally along the column, and when a potential is applied to the nozzles, charged droplets of the dispersed phase are discharged longitudinally towards the plates. This arrangement works well on the small scale but becomes progressively less efficient with scale-up due to the fact that the inner nozzles in the bank tend to be shielded electrostatically by the outer ones and therefore carry a smaller charge. As a consequence, only the outer nozzles produce the very small droplets required whilst the inner nozzles give rise to larger droplets having a lower specific area for mass transfer. Furthermore, since the larger droplets are not so highly charged, they are incapable of being accelerated to high velocities and so the advantage of low contact times is lost.

According to one aspect of the present invention, there is provided a method of electrostatically enhanced solvent extraction in which a dispersed phase interacts with a continuous liquid phase flowing through a column in counter-current relationship, wherein the improvement comprises locating interacting means in the column so as to catch the dispersed phase flowing in the column and so as to define a space at a side of the interacting means between the side and the side of the column and through which space the continuous phase flows, and providing an electric field to cause the discharge of charged droplets of the dispersed phase sideways from the interacting means through the space toward the side of the column.

According to another aspect, the invention provides apparatus for electrostatically enhanced solvent extraction comprising a column in which a continuous phase is arranged to flow therethrough in counter-current relationship with a dispersed phase, wherein the improvement comprises, means for catching a dispersed phase flowing through the column and for interacting the dispersed phase with the continuous phase, the interacting means being located in the column to define a space at a side thereof between the side and the side of the column and through which space the continuous phase is arranged to flow, and means for providing an electric field to cause the discharge of charged droplets of the dispersed phase sideways from the interacting means through the space toward the side of the column.

In a further aspect, the invention provides apparatus for electrostatically enhanced solvent extraction, the apparatus comprising a column for the counter-current flow of a continuous phase and a dispersed phase therethrough, one or a plurality of inlets for the introduction of the dispersed phase into the column to contact the continuous phase, at least one receptacle at an intermediate location in the column for catching the dispersed phase flowing through the column, the receptacle having side walls, an open top, and a closed base, the receptacle being located to define a space at the side thereof between the side of the receptacle and the column and through which space the continuous phase is arranged to flow, the receptacle having a plurality of discharge ports extending through the side walls and arranged to discharge the dispersed phase through the side walls and through the space toward the side of the column, and means for applying an electric potential to the receptacle to cause the discharge of charged droplets of the dispersed phase through the discharge ports.

Preferably, the cell comprises a column with the discharge ports being arranged to discharge droplets towards the side of the column.

Desirably, the flow of the continuous phase is biased away from the centre of the column so as to enhance the interaction of the continuous phase with the charged droplets.

Advantageously, the electric field strength applied to the receptacle is at least 1.5 kV/cm. Preferably a collector is disposed below the receptacle, the collector having radially disposed riser ports for the upward flow of the continuous phase therethrough, and a central outlet for the downward flow of dispersed phase therethrough. Conveniently the collector has a side wall that extends to at least the same height as the discharge ports in the cell, and the electric potential is applied between the discharge ports and the side wall.

Advantageously, the base of the collector is of frusto-conical form to bias the flow of the dispersed phase towards the central outlet, and bias the flow of the continuous phase towards the ports.

Preferably, a plurality of receptacles and collectors are located in series in the cell, and alternate receptacles may be oppositely charged. Conveniently, the collectors may be at earth potential.

Use of the invention overcomes the aforementioned problem by arranging nozzles in such a manner that no matter how many nozzles are employed, electrostatic shielding is avoided and all the nozzles can carry the same charge. This arrangement enables large diameter electrostatic solvent extraction columns to be envisaged and so opens the way to the exploitation of electrostatically enhanced solvent extraction on an industrial scale.

The invention will now be further described by way of example only with reference to the accompanying drawings, in which.

Figure 1:
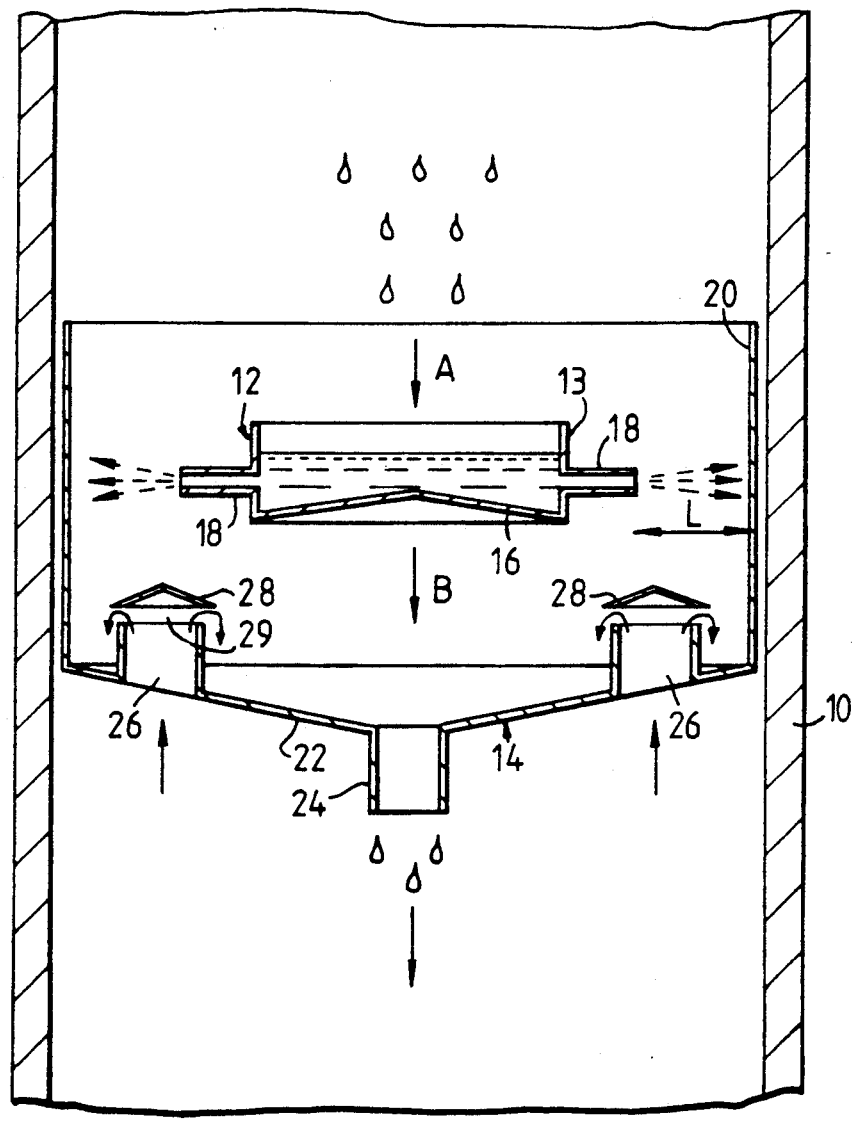
FIG. 1 shows a diagrammatic medial sectional view of part of an electrostatically enhanced solvent extraction column.
Figure 2:
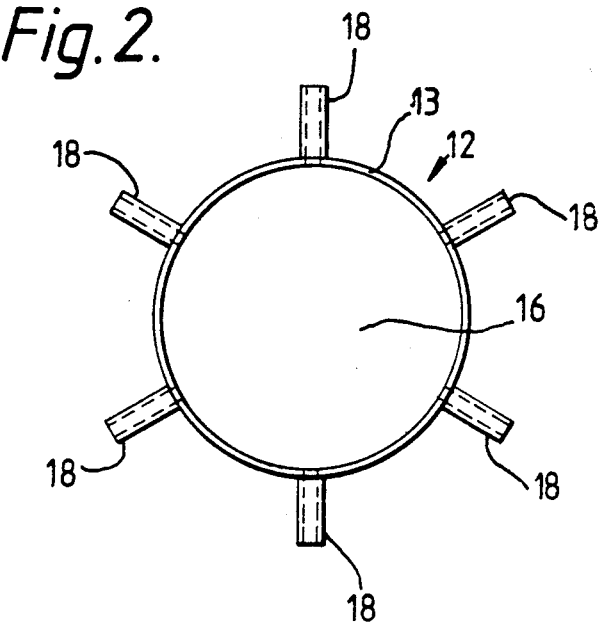
FIG. 2 shows to an enlarged scale a view in the direction of arrow A of FIG. 1.

Referring now to FIG. 1 and FIG. 2, part of a solvent extraction column 10 of hollow cylindrical form is shown, and it is assumed that a heavier phase (usually aqueous) is dispersed and therefore moves down the column 10. In the column 10 a shallow receptacle 12 is surrounded by a funnel-shaped collector 14. In a typical operation, the receptacle 12 is charged to a high potential by means of a DC generator (not shown) and the collector 14 is at earth potential.

The receptacle 12 dimensions are not critical but the receptacle 12 is made as small as possible in order to reduce the static hold-up of dispersed phase in the column 10. To this end, the underside 16 of the receptacle 12 may be inwardly dished as shown in order to reduce static hold-up still further. The receptacle 12 has an outer wall 13 supplied with six symmetrically disposed discharge ports in the form of nozzles 18 mounted as close to the bottom of the receptacle 12 as practicable.

The receptacle 12 is supported in the column by means of one or more rods of non-conducting material (not shown) and is electrically insulated from all other components of the column 10. The collector 14 is similarly supported unless the column 10 is operated with the collector 14 at earth potential.

Figure 3:
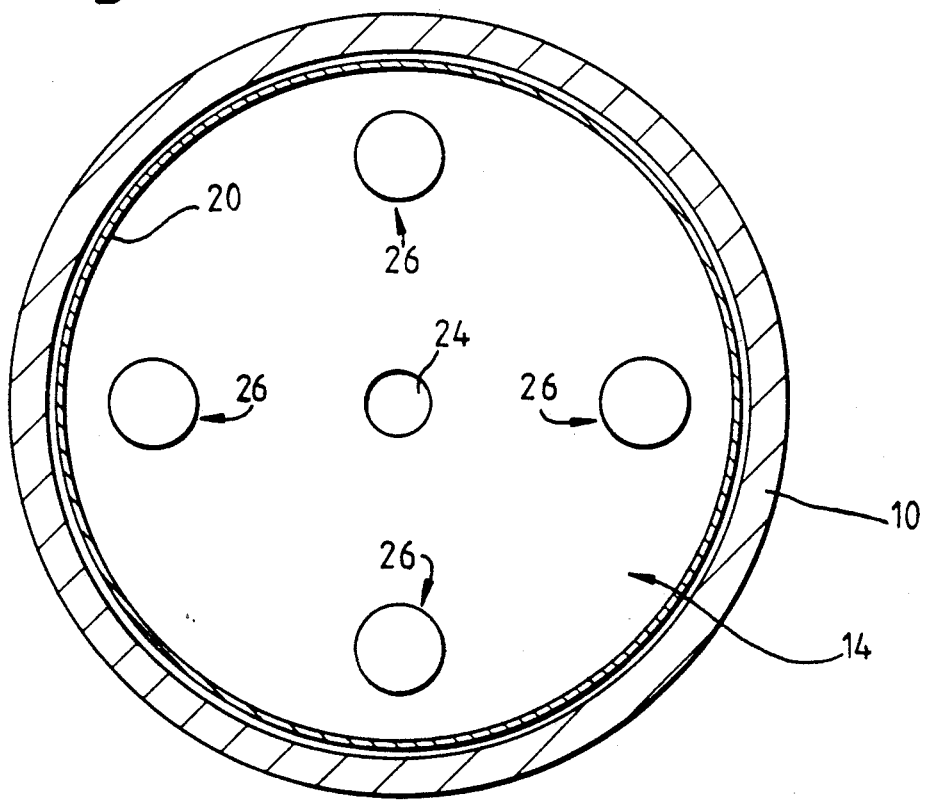
FIG. 3 shows a view in the direction of arrow B of FIG. 1.

Referring now to FIG. 1 and FIG. 3, the collector 14 has a vertical cylindrical wall 20 and a conical base 22 with a central outlet 24 through which the dispersed phase passes to the next receptacle 12 below. The base 22 has four symmetrically disposed radially displaced riser ports 26 through which the (lighter) continuous phase passes upwards through the column 10, the riser ports 26 having conical caps 28 defining gaps 29 in order to inhibit dispersed phase passing downwards through the riser ports 26 and thereby bypassing the receptacle 12 beneath. The diameter of the collector wall 20 is made such that it fits snugly within the column 10.

Figure 4:
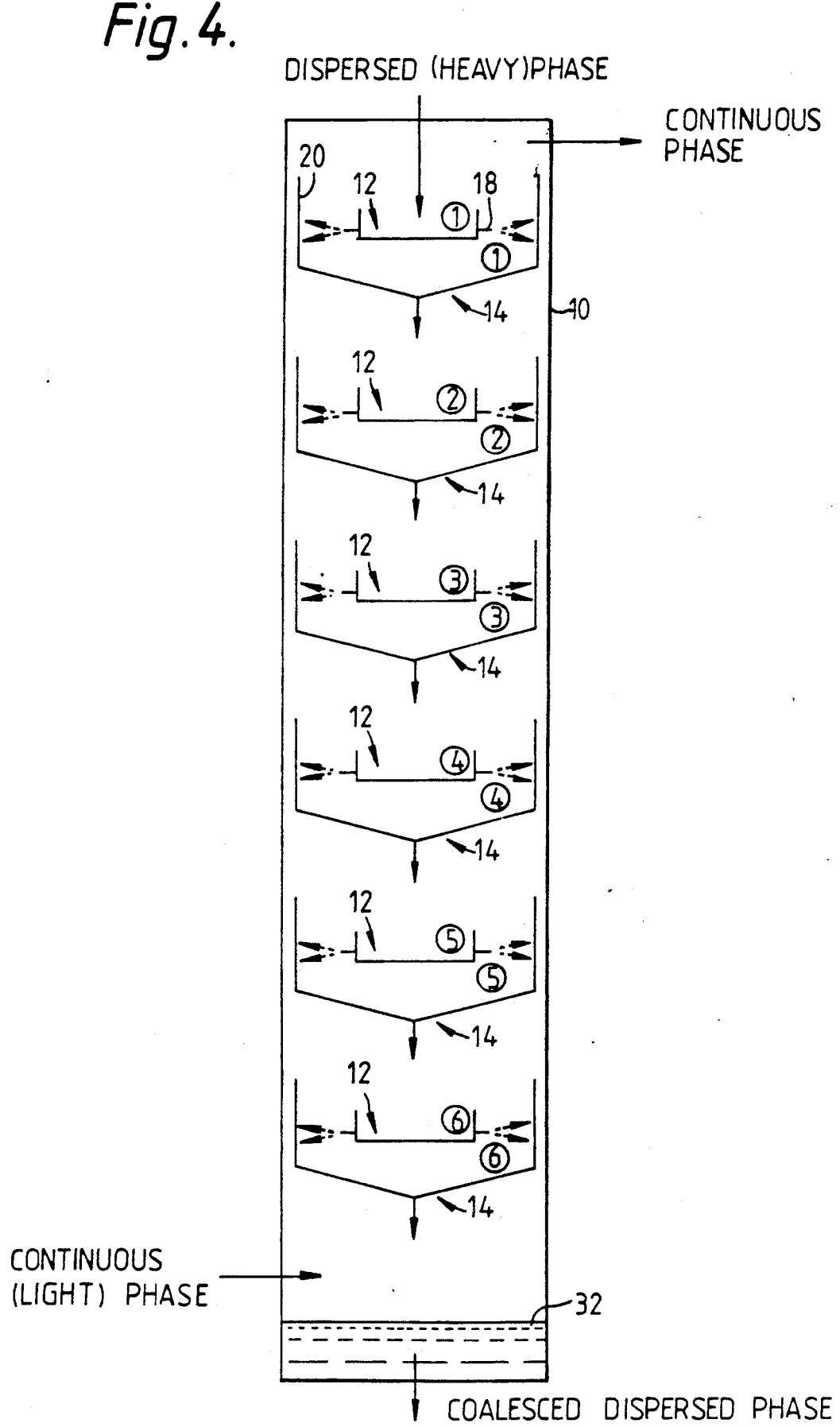
FIG. 4 shows to a reduced scale a line diagram of an electrostatically enhanced solvent extraction column.

As shown in FIG. 4, the column 10 may be constructed by stacking a series arrangement of receptacles 12 and collectors 14.

In one method of operation receptacles 12 identified as (1), (3) and (5) are positively charged whilst receptacles 12 (2), (4) and (6) are negatively charged with respect to earth potential. All the collectors 14 identified as (1)–(6) are earthed. This arrangement has the advantage that since all the collectors 14 are earthed they need not be electrically insulated from the column 10. Furthermore the heavy phase leaving the bottom of the column 10 is electrically neutral. It is however possible to operate with alternative circuits and, as an example, all receptacles 12 may be positively charged whilst all collectors 14 are negatively charged.

In FIG. 4, the conducting heavy phase (usually aqueous in practice) is fed to the top of the column 10 and enters receptacle 12 (1). The heavy phase flows through the charged nozzles 18 and issues as a charged spray of very small droplets of heavy phase. These droplets are attracted to the earthed collector 14 where they coalesce on the wall 20 and then flow by gravity down through the outlet 24 to the next receptacle 12 below where the entire process is repeated. Finally, the heavy coalesced phase leaves the collector 14 (6) and forms an interface 32 at the bottom of the column 10 from where it is withdrawn. The heavy coalesced phase could, in principle, be withdrawn directly from collector 14 (6) but by allowing it to flow to the bottom of the column 10 a small volume of column 10 is created for the introduction and distribution of the light continuous phase. The latter then rises up the column 10, passing through the riser ports 26 in each collector 14 on the way, and is withdrawn at the top of the column 10.

Contact between the two phases is effected in two different ways. Thus the rising continuous phase encounters the fine spray of dispersed phase droplets leaving each nozzle 18 and at the same time contacts the falling film of dispersed phase on the wall 20 of each collector 14. The overall mechanism of mass transfer is therefore a combination of cross-flow and countercurrent transfer.

By far the more important mode of transfer is that involving the droplet spray since in this case not only are the droplets oscillating because of the electrical charge that they carry but their interfacial area is also very high. The characteristics of the droplets, including their mean size, is controlled not by the nozzle 18 diameter but by the voltage applied to the nozzles 18. The important parameter is the electrical field strength between the tip of each nozzle 18 and the wall 20 of the collector 14.

Referring again to FIG. 1, the distance between the tip of each nozzle 18 and the wall 20 is denoted by L. If V volts are applied to the nozzles 18, the field strength E is given by V/L. When E is less than 1 kV/cm, droplets form separately at the nozzles 18 although they are smaller than would be the case if no field were applied. When E is equal to 1.5 kV/cm or greater, myriads of very small droplets issue from the nozzles 18 and it is in this "spray" regime that the column 10 should operate.

Although relatively high DC voltages may be called for, the current required is very small and only a few watts would be consumed by each receptacle 12. The invention is thus very economical in terms of energy utilisation. It should also be noted that the droplet size is independent of the nozzle 18 diameter in the spray regime. This is an important feature when extraction of liquors containing suspended solids is contemplated, such as biological broths which may contain cell fragments or other lysis products. In such situations, the nozzle 18 diameter may be made sufficiently large to avoid blocking without impairing the very small droplet size range needed to maintain a high interfacial area of contact. In principle the invention may be used in co-current as well as in counter-current flows through a solvent extraction column.

The number of nozzles 18 may be selected to provide a required discharge of charged droplets towards the wall 20. There may be fewer or more than the six shown in FIG. 2. Although the nozzles 18 have been shown as aligned normal to the longitudinal axis of the column 10, if desired the nozzles 18 may be aligned at alternative angles. The number of riser ports 26 is selected to provide the required flow of the continuous phase, and may be fewer or more than the four shown in FIG. 3.

The use of a relatively high wall 20 for the collector 14 has advantages, but if necessary the electric field could be applied between the nozzles 18 and the column 10.

I claim:

1. A method of electrostatically enhanced solvent extraction in which a dispersed phase interacts with a continuous liquid phase flowing through a column in counter-current relationship, wherein the improvement comprises, locating interacting means in the column so as to catch the dispersed phase flowing in the column and so as to define a space at a side of the interacting means between the side and the side of the column and through which space the continuous phase flows, and providing an electric field to cause the discharge of charged droplets of the dispersed phase sideways from the interacting means through the space toward the side of the column.

2. A method as claimed in claim 1, wherein the dispersed phase passes through a plurality of said interacting means and electric fields.

3. A method as claimed in claim 2, wherein alternate said electric fields are of opposite polarity.

4. A method as claimed in claim 2, wherein all said electric fields are of the same polarity.

5. A method as claimed in claim 1, wherein the droplets are discharged in a direction substantially normal to the general direction of flow of the dispersed phase.

6. A method as claimed in claim 1, wherein the electric field is at least 1.5 kv/cm.

7. Apparatus for electrostatically enhanced solvent extraction comprising a column in which a continuous phase is arranged to flow therethrough in counter-current relationship with a dispersed phase, wherein the improvement comprises, means for catching a dispersed phase flowing through the column and for interacting the dispersed phase with the continuous phase, the interacting means being located in the column to define a space at a side thereof between the side and the side of the column and through which space the continuous phase is arranged to flow, and means for providing an electric field to cause the discharge of charged droplets of the dispersed phase sideways from the interacting means through the space towards the side of the column.

8. Apparatus for electrostatically enhanced solvent extraction, the apparatus comprising a column for the counter-current flow of a continuous phase and a dispersed phase therethrough, one or a plurality of inlets for the introduction of the dispersed phase into the column to contact the continuous phase, at least one receptacle at an intermediate location in the column for catching the dispersed phase flowing through the column, the receptacle having side walls, an open top, and a closed base, the receptacle being located to define a space at the side thereof between the side of the receptacle and the column and through which space the continuous phase is arranged to flow, the receptacle having a plurality of discharge ports extending through the side walls and arranged to discharge the dispersed phase through the side walls and through the space towards the side of the column, and means for applying an electric potential to the receptacle to cause the discharge of charged droplets of the dispersed phase through the discharge ports.

9. Apparatus as claimed in claim 8 wherein the space defined is substantially annular.

10. Apparatus as claimed in claim 8, wherein the base of the receptacle is inwardly dished.

11. Apparatus as claimed in claim 8, wherein a collector is disposed below the receptacle, the collector having radially disposed riser ports for the upward flow of the continuous phase therethrough, and a central outlet for the downward flow of dispersed phase therethrough.

12. Apparatus as claimed in claim 11, wherein the collector has a side wall that extends to at least the same height in the column as the discharge ports, and the electric potential is between the discharge ports and the side wall.

13. Apparatus as claimed in claim 11, wherein the base of the collector is of frusto-conical form to bias the flow of the dispersed phase towards the central outlet, and bias the flow of the continuous phase towards the ports.

14. Apparatus as claimed in claim 11, wherein a plurality of receptacles and collectors are located in series in the cell.

15. Apparatus as claimed in claim 14, wherein the electrical potential means is arranged to apply opposite polarity electric potentials to alternate receptacles.

16. Apparatus as claimed in claim 14, wherein the electrical potential means is arranged to apply the same polarity electric potential to all the receptacles.

17. Apparatus as claimed in claim 8, wherein the electric potential means is adapted to apply at least 1.5 kv/cm.

* * * * *